US007155703B2

(12) United States Patent
Meijer et al.

(10) Patent No.: US 7,155,703 B2
(45) Date of Patent: Dec. 26, 2006

(54) VIRTUAL METHOD PROTECTION

(75) Inventors: Erik Meijer, Mercer Island, WA (US);
Craig T. Sinclair, Sammamish, WA (US); James H. Hogg, Bellevue, WA (US); Peter H. Golde, Bellevue, WA (US); Serge Lidin, Issaquah, WA (US); Christopher W. Brumme, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/622,413

(22) Filed: Jul. 18, 2003

(65) Prior Publication Data

US 2005/0015753 A1    Jan. 20, 2005

(51) Int. Cl.
*G06F 9/44*    (2006.01)
(52) U.S. Cl. .................. 717/116; 717/114; 717/118
(58) Field of Classification Search ........ 717/114–118, 717/136–140, 146–147
See application file for complete search history.

(56) References Cited

U.S. PATENT DOCUMENTS

| | | | | |
|---|---|---|---|---|
| 6,981,250 | B1 * | 12/2005 | Wiltamuth et al. | 717/120 |
| 2004/0143820 | A1 * | 7/2004 | de Jong | 717/166 |
| 2004/0143827 | A1 * | 7/2004 | de Jong | 717/106 |

OTHER PUBLICATIONS

Zaks et al. "Sealed Calls in Java Packages" 2000, ACM ISBN.*

Visual C++ Language Reference "Virtual Functions" downloaded from http://msdn2.microsoft.com/en-us/library/.*
Lhotka, R., "Overview of the .NET Framework", *WROX Conferences*, www.perfectxml.com/conf/wrox/files/rocky_net.pdf, 11 pages.
Pietrek, M., "Avoiding DLL Hell: Introducing Application Metadata in the Microsoft.NET Framework", *MSDN Magazine*, Oct. 2000, http://msdn.microsoft.com/msdnmag/issues/1000/metadata/print/asp, 1-13.
"Meta Definition and Semantics", *ECMA-335 Partition III*, http://dotnet.di.unipi.it/EcmaSpec/PartitionII, 13 pages.

* cited by examiner

*Primary Examiner*—Kakali Chaki
*Assistant Examiner*—Jason Mitchell
(74) *Attorney, Agent, or Firm*—Woodcock Washburn LLP (57) ABSTRACT

Performing validation of a derived virtual method includes receiving program code where the derived virtual method is derived from a virtual method of the program language used to generate the program code, compiling the program code to an intermediate language expression, generating metadata descriptive of the compiled program code, validating the use of the derived virtual method by accessing the metadata, and permitting the use of the derived virtual method if the metadata grants override permissions concerning the virtual method of the programming language. The metadata indicating access and override permissions may be generated while compiling the program code in the common language infrastructure. Alternately, the flag may use pre-existing values indicative of the access and override permissions concerning the virtual method of the programming language.

4 Claims, 7 Drawing Sheets

Fig. 1

Prior Art

Prior Art

Prior Art

VIRTUAL METHOD PROTECTION

FIELD OF THE INVENTION

The invention relates generally to the field of software development, and more particularly to the relationship between the accessibility and override-ability of virtual methods in program languages.

BACKGROUND OF THE INVENTION

The accessibility of virtual methods indicates the permission of who can call which virtual method in a programming language. The override-ability of virtual methods indicates a permission upon who can override or redefine which virtual methods in a programming language. These concepts are sometimes considered orthogonal. For example, in the Microsoft® (Redmond, Wash.) common language runtime™ (CLR), an implementation of the ECMA 335 standard for a common language infrastructure, accessibility and override-ability of virtual methods are treated as orthogonal. That is, a virtual method may be overwritten in a derived class, even if the method is not accessible or callable in that derived class if permissible by the program constraints.

Programming languages such as Component Pascal and C++ both require this behavior to implement the semantics of their language. These languages separate the concepts of accessibility and override-ability of virtual methods so that a virtual method can be overridden in a derived class even if it cannot be called (i.e. the virtual method is not accessible). Other languages such as C# and Java equate the concepts of accessibility and override-ability so that one may only override virtual methods that one may actually call.

Source languages have their own rules with respect to visibility and accessibility of members of types and, in particular, about virtual methods. In a multi-language environment, such as the Microsoft® CLR™ it is desirable that the semantics be preserved in the generated intermediate language, otherwise it would be possible to circumvent that language's semantics in other languages. For instance, in C# one cannot override virtual methods that are not accessible, but another language might allow this. If the intent of the C# semantics would not be captured in the intermediate language and enforced by the CLR™, it would be possible to override an inaccessible method in some other language.

Currently, there is no way that these languages can enforce their intended semantics to consumers of their assemblies, such as programmers. Thus, there is a need for mechanisms to enforce the intended semantics of program languages with respect to virtual methods in multi language environments. The present invention addresses the aforementioned needs and solves them by creating an identification field for semantic permissions identification and by testing for the condition to ensure proper enforcement.

SUMMARY OF THE INVENTION

A method of performing validation of a derived virtual method is presented which includes receiving program code where the derived virtual method is generated from a virtual method of the program language used to produce the program code, compiling the program code to an intermediate language expression, generating metadata descriptive of the compiled program code, and validating the override-ability of the derived virtual method by accessing the metadata. The metadata utilized is placed in a method attributes field associated with the virtual method. As a result, the derived virtual method may be permitted if the metadata grants access permissions concerning the virtual method of the programming language. Even if there are no access permissions granted, the derived virtual method may be permissible depending upon the state of the metadata concerning the virtual method of the programming language. By virtue of the invention, the concepts of accessibility and override-ability may be allowed to be orthogonal or may be locked together to be equivalent based on the status of the metadata.

One embodiment of the invention includes the insertion of the invention into a common language infrastructure environment supporting, for example, Microsoft® intermediate language™ (MSIL) and one or more input programming languages. Example programming languages may include C#, Component Pascal, C++ and visual basic. The invention involves the use of a flag which may include at least one bit wherein the bit indicates the availability of overriding the virtual method. The bit may be generated in metadata while compiling the program code in the common language infrastructure. Alternately, the flag may use pre-existing values indicative of the access and override permissions concerning the virtual method of the programming language. Other embodiments may utilize any execution environment for a virtual method.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The invention allows programmers to select the semantics involving accessibility and override-ability of virtual methods in various programming languages. In a typical common language infrastructure where multiple languages may be used, users may configure a language compiler for the two features or utilize and enforce the selection of override-ability and accessibility of virtual methods. If a user configures specific metadata in the intermediate language compiler in one manner, override-ability is restricted to accessibility. If the compiler is set in another manner, then override-ability is independent of accessibility.

The runtime system in a common language infrastructure may perform checks for validity. At this post-compile stage, the accessibility and override-ability may be checked to determine the availability of user variation of virtual methods for a specific language. For example, a verifier may check the accessibility rules during the loading verification to determine if a compiled program may call a virtual method outside the class in which it was defined and if so, determine if the method is overrideable.

Presently, for example, the Microsoft® CLR™ implementation of the ECMA 335 standard for the common language infrastructure supports multiple languages, which all compile programs in their respective source languages into intermediate language assemblies. The addition of the present invention provides flexibility to accommodate different rules for utilizing virtual methods.

Aspects of the invention allow compilers to encode the semantics of override-ability of virtual methods and extends the runtime environment to check this constraint when loading the class that attempts to override another method. This invention is applicable to any execution environment where a derived virtual method or a virtual method may be used. Consequently, the specific embodiments are to be considered exemplary and not limiting.

Exemplary Computing Device

Figure 1:
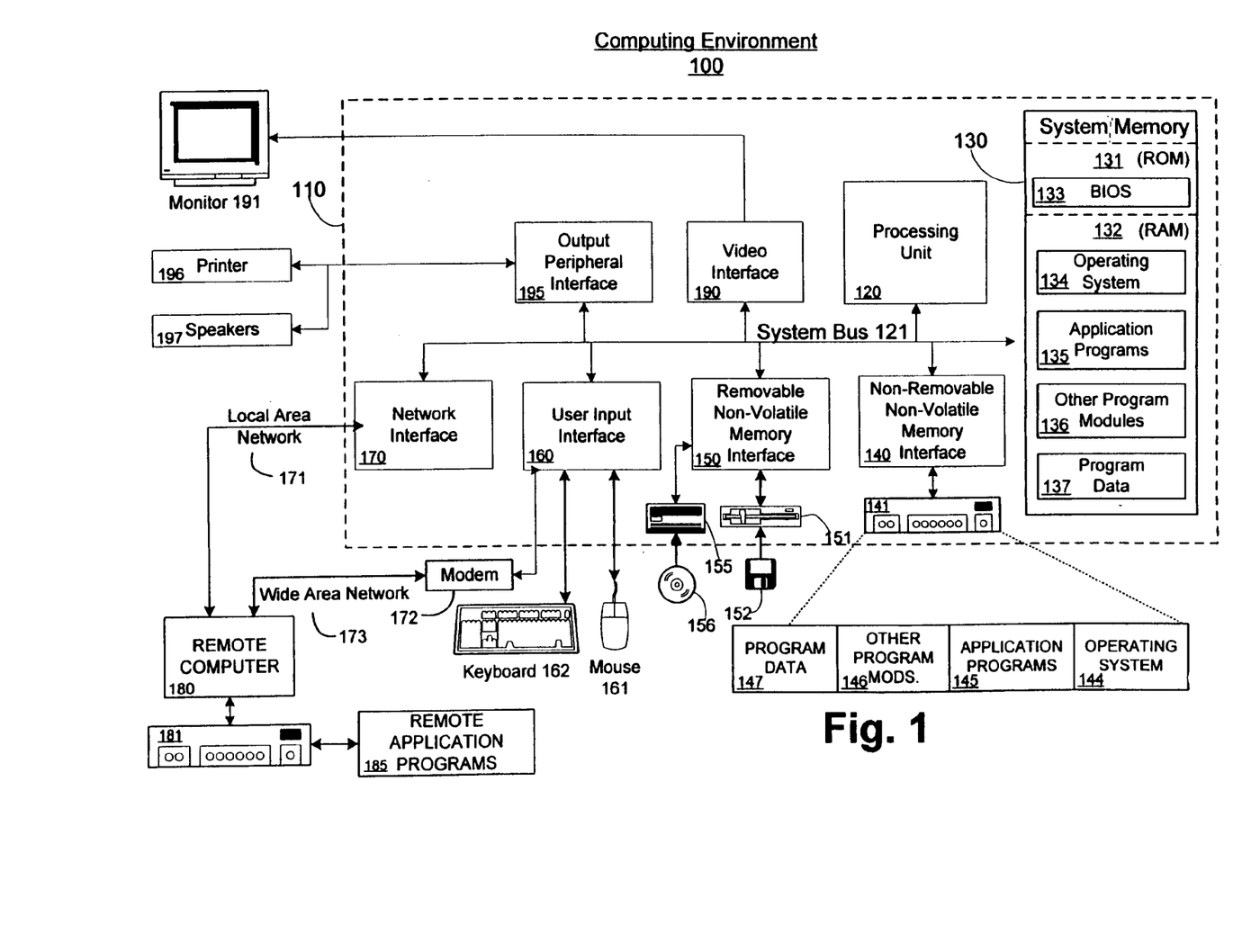
FIG. 1 is a block diagram showing an exemplary computing device in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, Microsoft®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Computing Environment

Aspects of the present invention find utility in a common language infrastructure (CLI) architecture, such as that defined in ECMA-335, 2001. Specifically, a system such as the .NET™ architecture defined by Microsoft® of Redmond, Wash., is an example of a system embodying the common language infrastructure.

The ECMA-335 standard establishes a multi-language runtime system embodying the common language infrastructure. The objective of the CLI is to make it easier to write components and applications from any language. The CLI architecture does this by defining a standard set of types, making all components fully self-describing, and providing a high performance common execution environment. This ensures that all CLI compliant system services and components will be accessible to all CLI aware languages and tools. In addition, this simplifies deployment of components and applications that use them, in a way that allows compilers and other tools to leverage the high performance execution environment. The CLI presumes that object-oriented programming will be the programming model. The ECMA-335 standard defines a common type system (CTS), a common language specification (CLS), and a multithreaded execution environment capable of supporting applications composed of modules derived from programs written in multiple languages.

Figure 2:
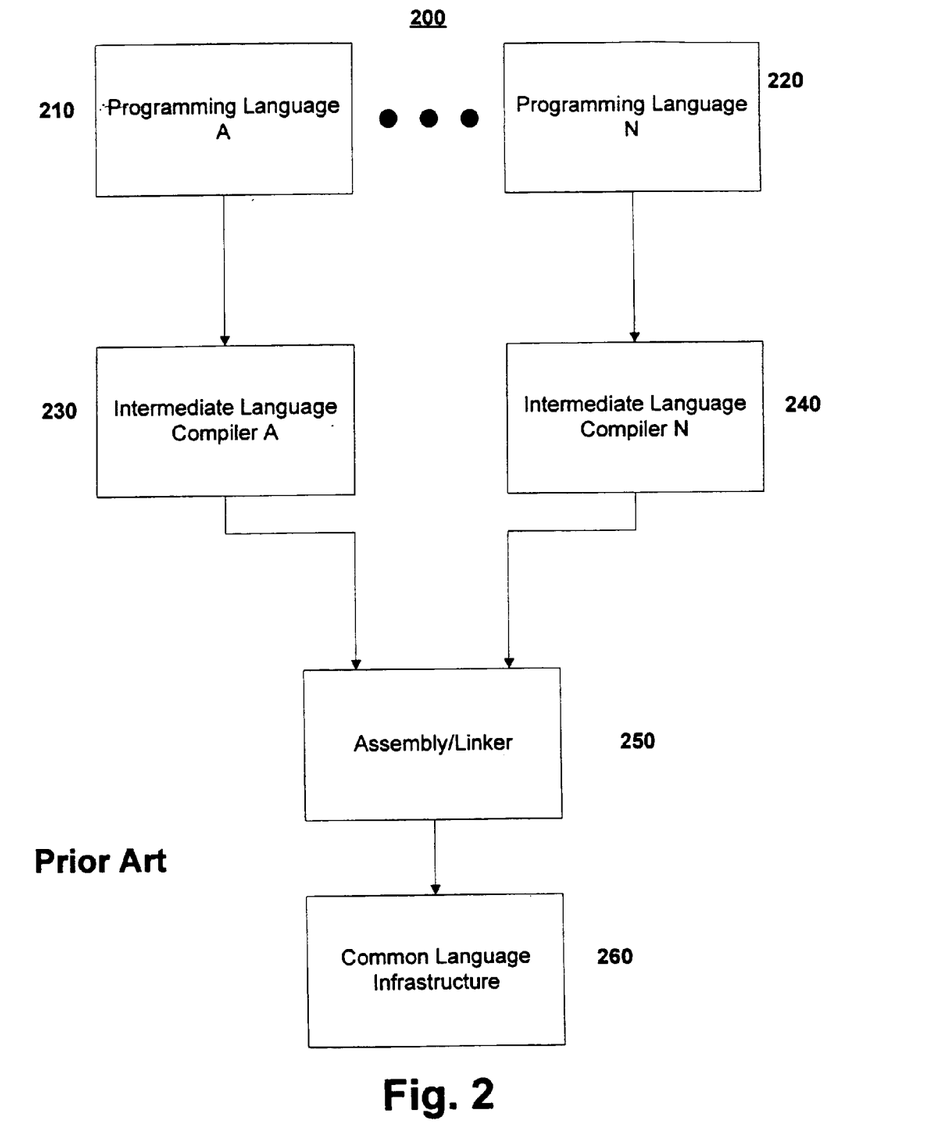
FIG. 2 depicts a block diagram showing an exemplary functional environment in which aspects of the present invention may be implemented.

The CLI specification addresses a more basic problem than distributed programming support, but in solving the general problem, it also provides a leading edge runtime system for distributed programming. One CLI implementation is partially depicted in FIG. 2. Any particular CLI implementation may be independent of any particular high level programming language. For example, the programming languages 210, 220, may be, for example, C#, C++. Visual Basic or Java script. The idea is that translation systems for different languages can be implemented to generate code targeted for the Common Language Specification supported by the CLI, rather than for a language-specific runtime. In the example of .NET™, the translation system may be the intermediate language compilers 230, 240 that compile to the Microsoft® intermediate language (MSIL™). The intermediate language compilers 230, 240 generate CTS self-describing types that provide enough information to allow them to be combined with software components written in other languages. This combining may be performed in an assembly/linker 250 before being used by a CLI infrastructure 260. This architecture and use of an intermediate language allows components of a computation to be written in different languages that can then be statically linked at compile/link time, or dynamically linked at run time.

Figure 3:
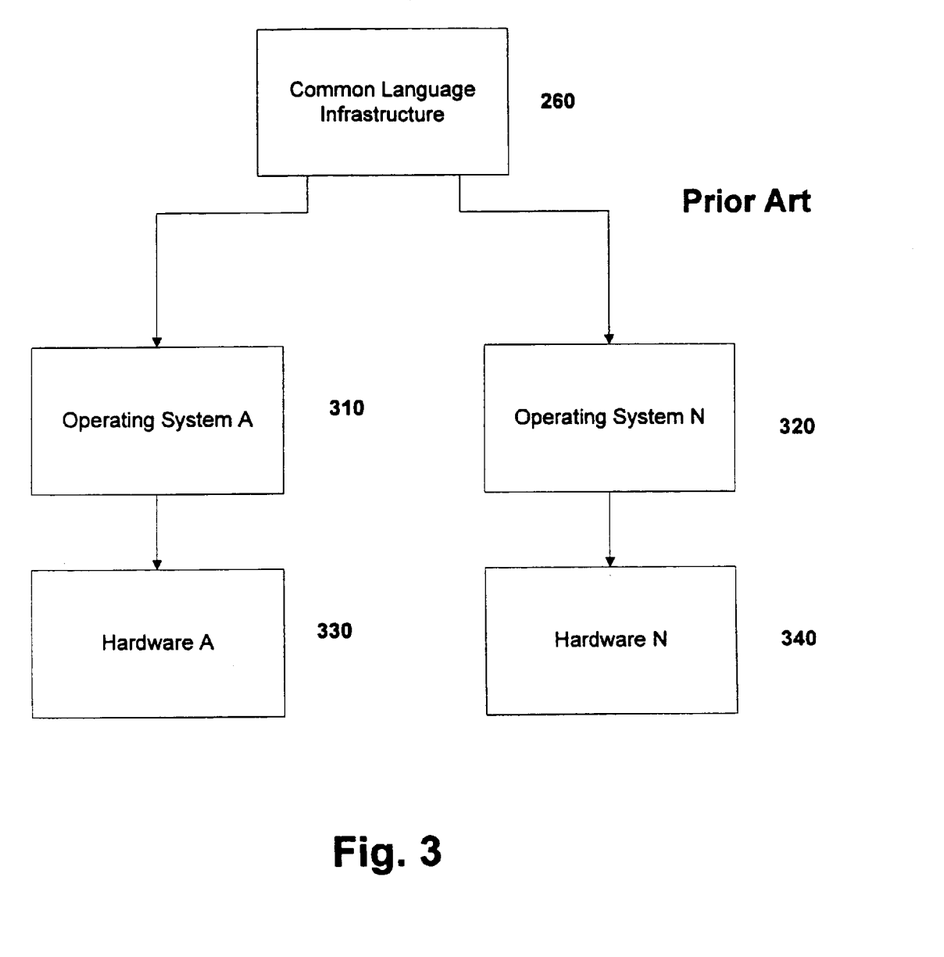
FIG. 3 depicts a further block diagram showing an exemplary functional environment in which aspects of the present invention may be implemented.

FIG. 3 continues the prior art framework by depicting the elements of a typical .Net™ architecture below the common language infrastructure. Once one or more programs are compiled into an intermediate language, they can be targeted to a specific operating system 310, 320 and respective execution hardware 330, 340. Utilizing FIGS. 2 and 3, it may be seen how components written in two or more languages may be used to operate one or more hardware functions in possibly two or more different execution environments. For example, a Visual Basic program can call a member function in a C++ object, and the call can extend across the operating system process address spaces.

Figure 4:
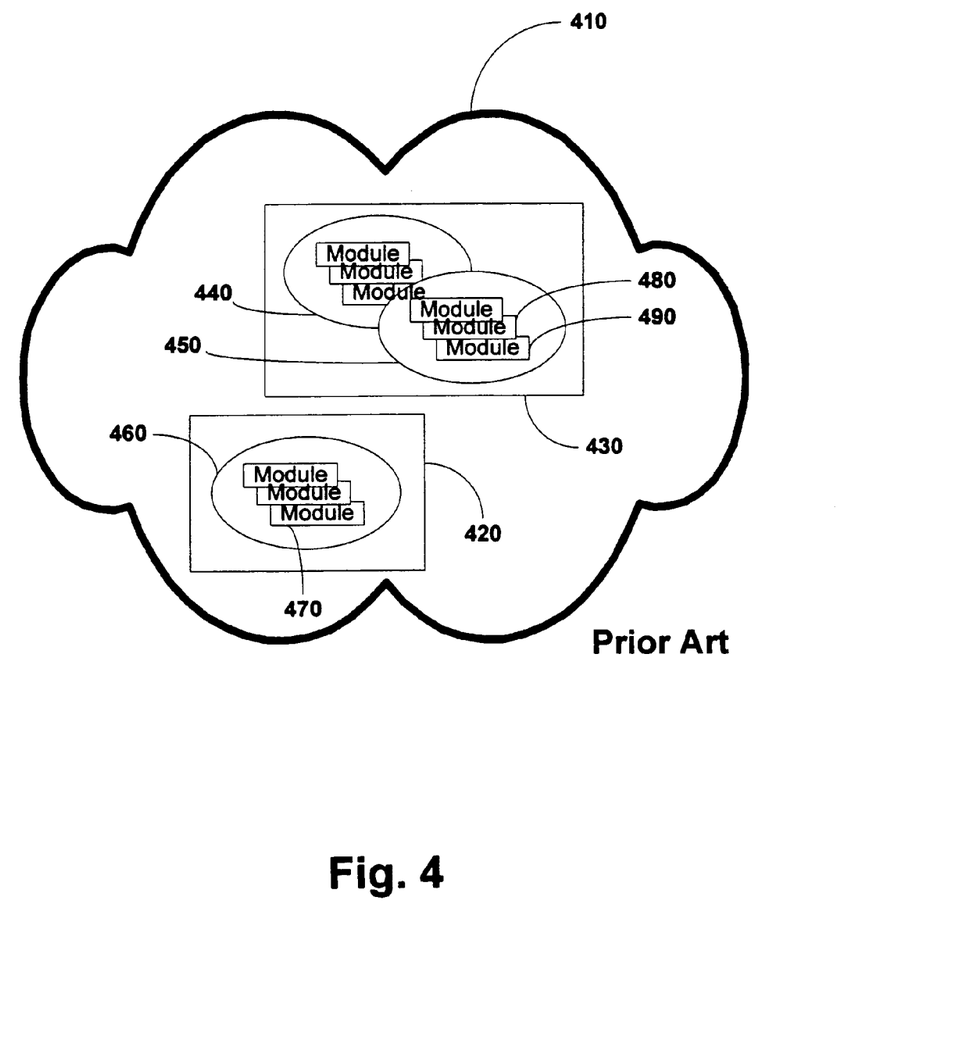
FIG. 4 depicts an exemplary hierarchy for software structures applicable to the invention.

FIG. 4 depicts the basic relationship between program elements in a CLI. Intermediate language compilers 230, 240 (refer to FIG. 2) generate modules 470, 480, 490 as their basic output unit. Modules are then combined to form assemblies 440, 450, 460. Assemblies may operate by themselves, or may be combined with other assemblies to form application domains 420, 430. Multiple application domains may represent applications and may execute in a single address space 410. Typically, such multiple address spaces may be executed within an operating system without interference.

The CLI employs an explicit mechanism, metadata, to enable the compiler to pass a complete CTS self-description of the types that are defined in the module to the runtime system. Metadata can also be used to pass other information, in addition to types, to the runtime. Metadata provides a mechanism by which the translation environment can pass arbitrary information to the parts of the system that execute the intermediate language. The executable specification of the code includes both the intermediate language and the metadata.

The principle advantage of using metadata is that a type checking system can combine static and dynamic techniques. When the intermediate language is executed, the virtual execution system has all of the type definition information available, so it can easily perform runtime type checking, termed "reflection" in the CLI. That is, reflection is the means of interpreting the self-describing types. Also by including the full type description, one module can be combined with other modules written in a different source programming language since the CLI will use the common type specifications incorporated in the metadata to implement member function invocation.

Strings, images, and other data that are used in the code are isolated from the intermediate language by placing them in a resource constituent of the file. Each module containing metadata, intermediate language and resources may be stored in a file using the portable executable (PE) format. The PE format is used for ordinary Windows executable files, so the system needs to be able to distinguish PE files that contain CLI code from files that contain Windows-specific code. The translation environment may combine modules to define an assembly or a DLL that is treated much like an assembly. Within the collection of modules in an assembly, at least one of the modules must include a manifest to provide an overall description of the assembly including the list of modules in the assembly. The assembly has a single main entry point in one of its modules, a set of exported type definitions, such as member functions, and a set of unbound external references to other assemblies. An assembly is the unit of deployment managed by the CLI implementation. It defines the unit of code that will be downloaded to a machine, a unit of management for security mechanisms, a scope for type definitions and references such that an object in one assembly can invoke a member function in another assembly. An assembly may be a reusable software component that can be used by itself or be combined with other components to implement a more complex unit of computation.

Metadata may be defined as data concerning data. Such information is used to completely and accurately describe system level attributes or component interfaces. Metadata makes it possible, for example, for a class written in Visual Basic to fully inherit from a base class written in any .NET™ language without recompiling when the base class changes. The information contained in the metadata makes this possible and transparent to the programmer. Metadata is compiled to binary code at the same time as the intermediate language and stored as an assembly in executable or DLL form. The use of metadata allows programming assemblies to be generated and called by any language within the common language infrastructure.

An assembly may contain metadata that contains descriptive items such as name, version, default user language, verification information, such as a public key, data types, dependencies, and security permissions. It includes the base classes and interfaces necessary to execute the assembly, and may also include specific information defined by the programmer or compiler. This information is all that the common language infrastructure needs to efficiently manage the differences between languages.

Figure 5:
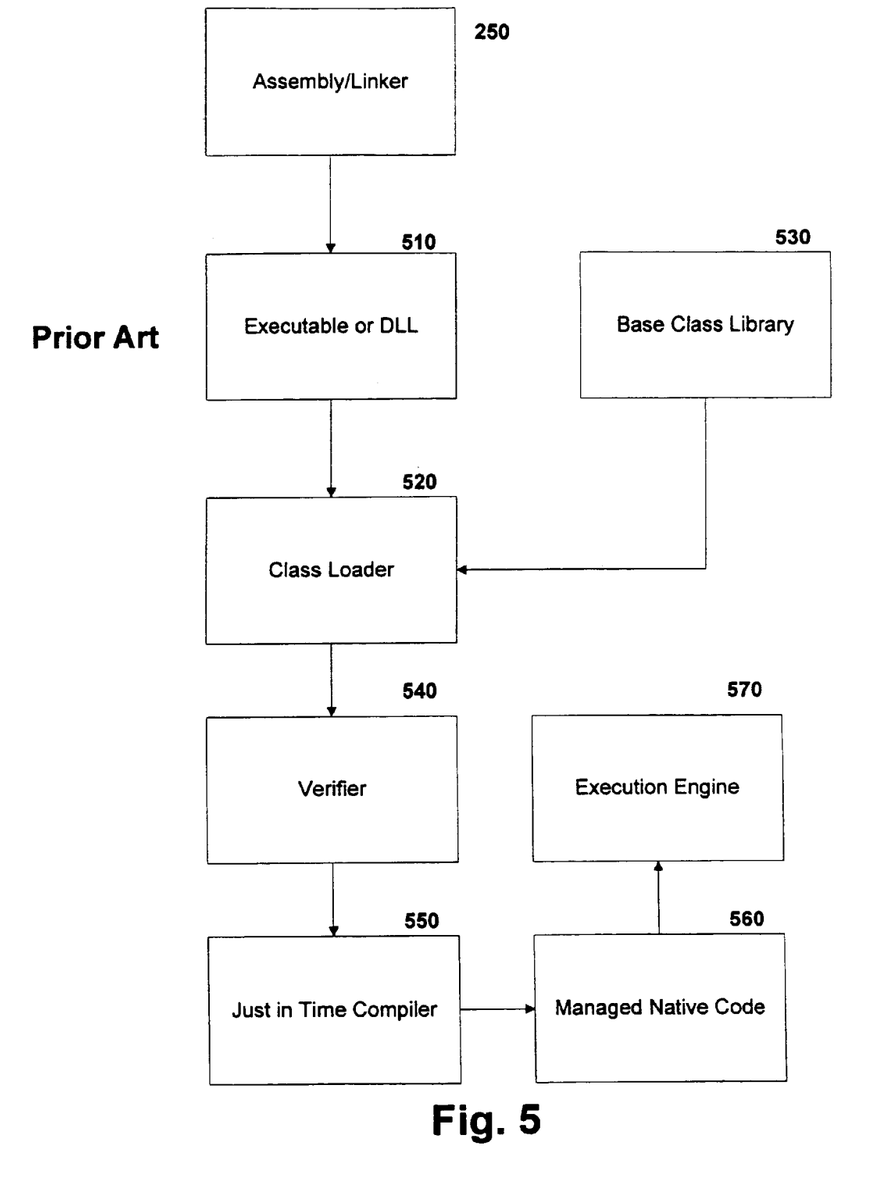
FIG. 5 depicts a block diagram showing exemplary runtime functions in which aspects of the present invention may be implemented.

FIG. 5 depicts a common language runtime or a virtual execution system. Starting with the assembly/linker 250, the intermediate language representation of the input program, along with the respective metadata is stored as an assembly unit in a executable or DLL 510. The code in the executable or DLL is still intermediate language and may be stored in any convenient form, for example in a hard drive. When the executable or DLL is executed, the intermediate language and pertinent information from the base class library 530 may be sent to the class loader 520. The combined code is first sent to the verifier 540 where it is tested for such things as type safety. The verified code is then sent to the just-in-time (JIT) compiler 550 which uses the intermediate language to create managed native code 560. Next, the managed native code 560 is sent to the runtime manager execution engine 570 of the system. This prior art scheme allows the execution of many different languages at the same time and may be an environment for the implementation of the present invention.

Exemplary Embodiments

Figure 6:
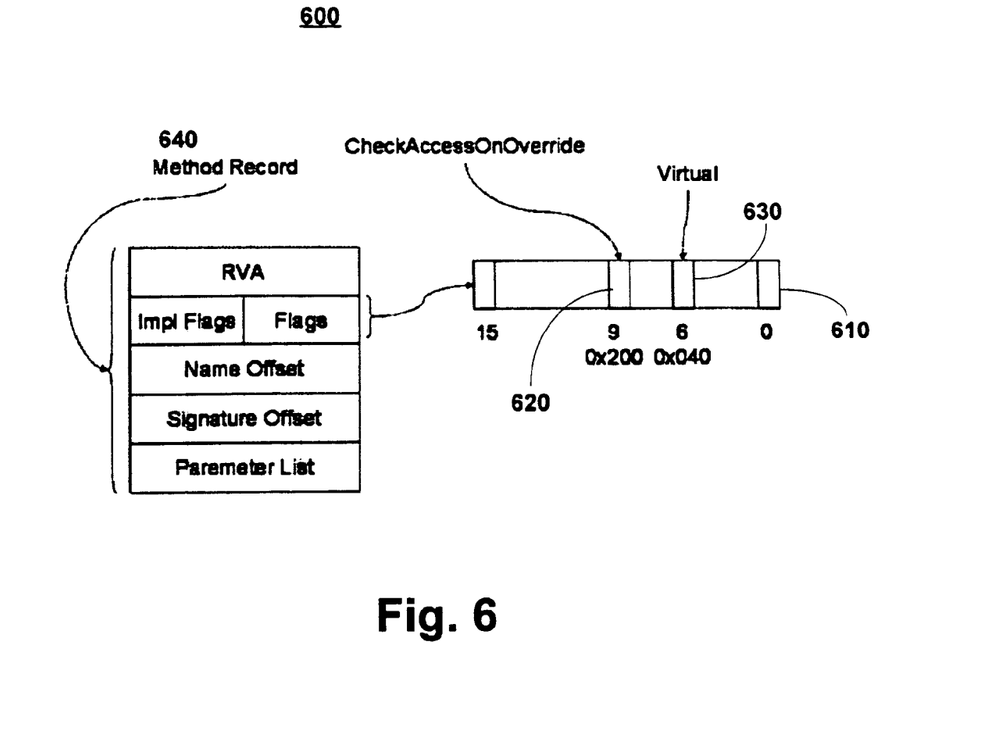
FIG. 6 depicts a diagram of exemplary defining bit fields embodying some aspects of the invention.

FIG. 6 depicts a block diagram of an exemplary definition format 600 that may be used in accordance with the invention. One embodiment of the invention involves the utilization of bits set as flags in a metadata field associated with a method to indicate the accessibility and override-ability of virtual methods in language compilers. In this embodiment, specific compilers would assert or not assert metadata into a flag field 610 wherein a CheckAccessOnOverride bit 620 and a virtual bit 630 would reveal the constraints on virtual methods put into place by the specific compiler.

For example, given a virtual method, the intermediate language compiler (e.g., reference FIG. 2, 230, 240) can allow the virtual method to be overridden even if it is not accessible within the constraints of the language. Each language may have its own requirements as to such override-ability and accessibility of virtual methods. Languages such as C# and Visual Basic may equate accessibility and override-ability and disallow virtual methods to be overridden when not accessible. However, other languages such as Component Pascal and C++ do allow their virtual methods to be overwritten even when the virtual method is inaccessible. This condition of override-ability when the virtual method is inaccessible allows a derived method or a subclass to be utilized when the technique of the invention is used.

The invention allows a characterization of the compiled language such that assembly/linking of intermediate language expressions can be accomplished without violating the intention of the language in a common language infrastructure implementation. The constraint of allowing or disallowing overriding virtual methods may be enforced by the common language infrastructure verifier (e.g., reference 540 in FIG. 5). This enforcement method implies that verifiable code does not violate the overwrite-ability constraint asserted by a compiler. Also, the constraint may be honored via dynamic enforcement within the runtime system.

The setting of bit mdCheckAccessOnOverride 620 in FIG. 6 indicates that the method can only be overwritten when the method is also accessible. One embodiment of the invention utilizes a method record 640 compliant with the ECMA-335 Partition II standard method. The new modifier 620 utilizes an unused bit in Method Flags field (ECMA-335 Partition II section 21.24). The new modifier 620 of the invention allows compiler writers to support both lax virtual methods, such as in C++ and Component Pascal where accessibility is orthogonal to override-ability, and strong virtual methods, such as in C# and Visual Basic where accessibility is equal to override-ability. In an intermediate language, one may use the method flag keyword virtual to set the mdCheckAccessOnOverride 620 bit as it may or may not be set by default. It should be noted that Reflection and Reflection/Emit have a new value method/attribute CheckAccessOnOverride=0x0200 that one may use if one desires to generate code using Reflection.emit. In C#, the CheckAccessOnOverride may be set by default. The default behavior of the runtime system where the invention is deployed may remain unchanged. That is, if one does not set the CheckAccessOnOverride bit on a virtual method, then the virtual method may be overwritten in other classes even if the method is not accessible at that time. As an example, in C# only accessible methods can be overridden, in C++ or Component Pascal a method can be overridden even if they are not accessible. The bit definition format 600 allows the expression of both semantics. As is well known by those of skill in the art, the ECMA335 Partition II Flags for Methods, Section 22.1.9, utilizes the predefined flags of Private, Assembly, Family, Public and Virtual, among other flags, to assist tin the definition of accessibility method attributes. The invention may utilize these flags as well as the new modifier of CheckAccessOnOverride to perform the override-ability and accessibility determinations.

As is well known in the art, metadata associated with an intermediate language representation in a common language infrastructure system may be generated via application programming interface calls. Such application programming interface calls may generate the requested metadata directly into a binary format which can be used as needed to implement the invention. Such calls may utilize pre-existing values or values generated during compiling.

Figure 7:
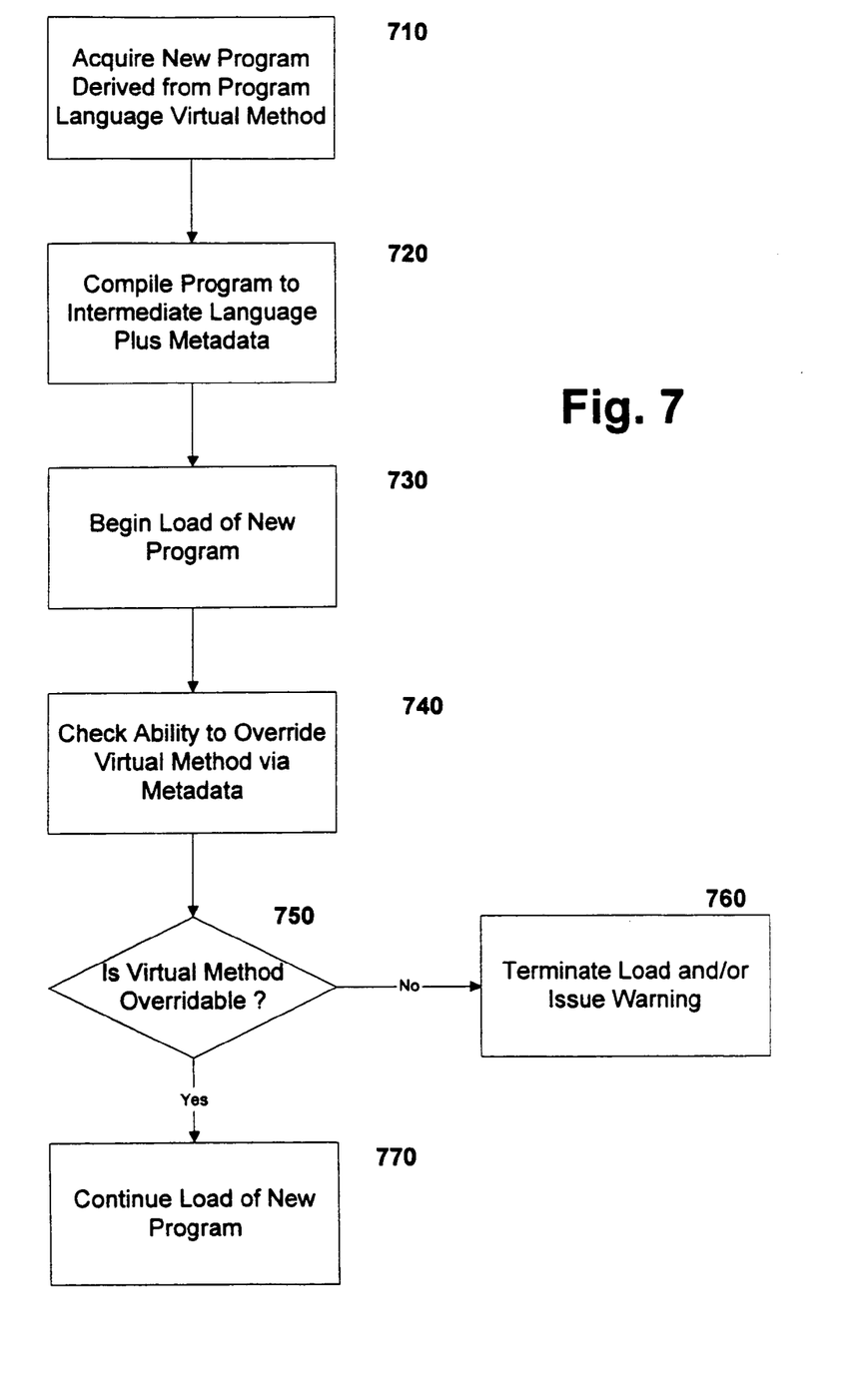
FIG. 7 illustrates an exemplary flow diagram applicable to aspects of the invention.

FIG. 7 is a flow diagram of an exemplary method 700 in accordance with the present invention. Initially, a new program is generated 710 which utilizes a sequence of programming steps derived from a virtual method. For example, if a virtual method includes a four step process, the derived method may be a three or a five step process that utilizes an application programming interface call of the virtual method. Once the new program is made available, then the new program may be compiled 720 to an intermediate language. Metadata, along with the intermediate language may be generated at this point. The metadata may be formed via an application programming interface call or may be generated directly. The metadata includes flags indicative of the accessibility and override-ability of the programming language virtual method. It is to be noted that this step of intermediate language and describing metadata may be performed in a common language infrastructure as described herein. Alternately, step 720 may be performed in any system which utilizes a translating compiler. It should also be noted that the generation of metadata definition fields may occur contemporaneous with the compilation or may be generated by using pre-existing field definitions of the specific type of compiler utilized in the system.

After compilation, the compiled new program may be inserted into a suitable loader 730. The loader lays out types in memory and performs various checks. Such checks may include such determinations as not overriding a virtual method when the virtual method is not accessible and an override-ability flag is set.

The ability of the compiled program to allow virtual method overrides may be checked 740 by inspecting a flag set by the compiler or asserted by the program in metadata to indicate the availability of overwrites on virtual language methods. This check may be performed in a verifier. The decision as to whether virtual methods are override-able 750 may then be deterministic. If the programming language virtual method is override-able, then the new program with its derived virtual method may continue to be loaded 770. This continuation may involve a just-in-time compiler operation prior to generation of machine code. Additionally, checks may optionally be performed, such as flow analysis and security verifications. Eventually, a managed execution engine controls execution of the code and may optionally perform such tasks as memory management, security, and remoting, among others known in the art. If the virtual method is not permitted, then the load may be terminated 760. Optionally, a terminated load may be tagged and the programmer or user alerted via a warning message. Alternately, the non-terminated but prohibited virtual method new program may be allowed to continue to load, but a warning may be issued.

One exemplary embodiment showing a utilization of the invention is provided in the C# program code provided in Appendix I. The exemplary C# code example defines a simple class with a single virtual method. The example involves a method, Foo, of the C# class C which may be translated by a compiler into Microsoft® intermediate language™ (MSIL™). MSIL has both a binary representation in the form of metadata tables and a textual representation. Both of these representations are specified in the ECMA 335 standard Partition II.

In the C# source code, the method Foo has various modifiers, such as internal and virtual. In the corresponding textual MSIL, these modifiers show up as assembly and virtual, respectively. The other modifiers hidebysig, newslot strict, and instance encode other properties of this method. These modifiers are implicit in the C# source code, but show up explicitly in the MSIL representation. In the binary representation the modifiers assembly, virtual and strict are represented by three bits in the flags section of the Method Table for Foo, namely 0x003 Assembly, 0x040 Virtual, and 0x200 CheckAccessOnOverride. Note that the modifier is implicit in the C# source code, but shows up as strict in the textual MSIL and as CheckAccessOnOverride in the binary form.

In general, the C# program of Appendix I generates class C with virtual method Foo. This method is an assembly with accessibility and CheckAccessOnOverride flag bits set. The compiled MSIL program D.il defines class D that extends class C and overwrites virtual method Foo. The Microsoft® common language runtime™ refuses to load class D since it violates the CheckAccessOnOverride condition. The verifier provides an unhandled exception warning:

System.TypeLoadException: Method Foo on type D from assembly D, Version=0.0.0.0, Culture=neutral, PublicKeyToken=null is overriding a method that is not visible in this assembly. at Demo.Main( ).

Therefore a breech of the protected virtual methods in the C# program is prevented.

As mentioned above, while exemplary embodiments of the present invention have been described in connection with various computing devices and network architectures, the underlying concepts may be applied to any computing device or system in which it is desirable to implement an identification and enforcement system for virtual methods. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

APPENDIX I

C# Exemplary Embodiment Code for Virtual Method Protection

The following is an exemplary C# program that defines a simple class with a single virtual method in an embodiment of aspects of the invention.

```
// assembly C.dll
public class C {
    internal virtual void Foo( ){
        Console.WriteLine("C.Foo");
    }
}
```

The internal modifier on the method indicates that access to this method is limited to the current assembly, where from the C# point of view access means both calling the method Foo as well as overriding the method Foo. If a user were trying to either call or override C.Foo in a different assembly, the C# compiler will either warn that "'C.Foo( )' is inaccessible due to its protection level", or that "'D.Foo( )': no suitable method found to override"

```
// assembly D.exe
using System;
public class D: C {
    // cannot override Foo in another assembly
    internal override void Foo( ){
        Console.WriteLine("D.Foo");
    }
}
public class Demo {
    public static void Main( ){
        D d = new D( ); // force D to load
        C c = new C( );
        c.Foo( );// cannot call Foo in another assembly
        Console.ReadLine( );
    }
}
```

The class gets compiled into the following intermediate language (IL) class declaration, that shows the new strict modifier on the method Foo:

```
.class public auto ansi beforefieldinit C extends [mscorlib]System.Object {
.method public hidebysig specialname rtspecialname instance void .ctor( )
cil managed {
    .maxstack 1
    ldarg.0
    call      instance void [mscorlib]System.Object::.ctor( )
    ret
}
.method assembly hidebysig newslot strict virtual instance void Foo( ) cil
managed {
    .maxstack 1
    ldstr     "C.Foo"
    call      void [mscorlib]System.Console::WriteLine(string)
    ret
}
}
```

The classes D and Demo would get compiled into the following IL:

```
.assembly extern C{}
.assembly extern mscorlib { }
.assembly D{}
.class public auto ansi beforefieldinit D
       extends [C]C
{
    .method assembly hidebysig virtual instance void
            Foo( ) cil managed
    {
        .maxstack 1
        ldstr     "D.Foo"
        call      void [mscorlib]System.Console::WriteLine(string)
        ret
    } // end of method D::Foo
    .method public hidebysig specialname rtspecialname
            instance void .ctor( ) cil managed
    {
        .maxstack 1
        ldarg.0
        call      instance void [C]C::.ctor( )
        ret
    }
}
.class public auto ansi beforefieldinit Demo
       extends [mscorlib]System.Object
{
    .method public hidebysig static void Main( ) cil managed
    {
        .entrypoint
        // Code size    19 (0x13)
        .maxstack 1
        .locals init ([0] class D d, [1] class [C]C d)
        newobj    instance void D::.ctor( )
        stloc.1
        newobj    instance void [C]C::.ctor( )
        stloc.0
        ldloc.0
        callvirt instance void [C]C::Foo( )
        call      string [mscorlib]System.Console::ReadLine( )
        pop
        ret
    }
    .method public hidebysig specialname rtspecialname
            instance void .ctor( ) cil managed
    {
        .maxstack 1
        ldarg.0
        call      instance void [mscorlib]System.Object::.ctor( )
        ret
    }
}
```

When running Demo.Main, the following exception may occur when creating loading class D, since the method Foo on class C was marked as strict virtual. Unhandled Exception: System.TypeLoadException: Method Foo on type D from assembly D, Version=0.0.0.0, Culture=neutral, PublicKeyToken=null is overriding a method that is not visible in this assembly. at Demo.Main( )

This corresponds to the "no suitable method found to override" error message from C#. However, when the strict modifier is removed from the declaration of Foo in class C, the override does not cause any problems, even if C.Foo was marked as having assembly (or in C# terminology internal) accessibility, the Microsoft®Common Language Runtime™ (CLR) allows it to be overridden anyway.

Since loading the class D succeeds without problems, execution can continue to the call to C.Foo, where, now, an exception may be generated due to the attempted access of a C.Foo in another assembly other than where it was originally defined. Unhandled Exception: System.MethodAccessException: C.Foo( ) at Demo.Main( )

This corresponds to the C# error message "'C.Foo( )' is inaccessible due to its protection level". Therefore the invention has enabled the honoring of the override flag settings for the compiler language.

What is claimed:

1. A method of linking accessibility and override-ability of virtual methods comprising:
   setting at least one bit in metadata indicative of allowing a virtual method to be overridden;
   checking the status of the at least one bit to determine if accessibility of the virtual method need be verified before overriding the virtual method, wherein a first state of the at least one bit is indicative of granting an unconditional override of the virtual method and a second state of the at least one bit is indicative of granting an override dependent on the accessibility of the virtual method, further wherein the accessibility is indicated by flag bits in metadata comprising a private bit, a public bit, an assembly bit, a family bit and a virtual bit; and
   performing or refusing the override of the virtual method based on the at least one bit and the flag bits.

2. A computer system comprising:
   a processor which acts upon an input program comprising at least one virtual method;
   a mechanism establishing a potential correspondence between accessibility and override-ability of a virtual method comprising at least one bit of metadata;
   wherein the processor utilizes the mechanism to detect the potential correspondence between accessibility and override-ability before allowing the at least one virtual method to be overridden, further wherein a first state of the mechanism permits the at least one virtual method to be overridden if the at least one virtual method is not accessible, and further wherein a second state of the mechanism equates accessibility and override-ability; and
   the processor performing or refusing an override of the virtual method based on the at least one bit and the accessibility.

3. The computer system of claim 2, wherein a derived method being generated from the at least one virtual method is subject to the mechanism establishing a potential correspondence between accessibility and override-ability of a virtual method.

4. A computer-readable storage medium having computer-executable instructions for performing a method of linking accessibility and override-ability of virtual methods comprising:
   setting at least one bit in metadata indicative of allowing a virtual method to be overridden; and
   checking the status of the at least one bit to determine if accessibility of the virtual method need be verified before overriding the virtual method, wherein a first state of the at least one bit is indicative of granting an unconditional override of the virtual method and a second state of the at least one bit is indicative of granting an override dependent on the accessibility of the virtual method, further wherein the accessibility is indicated by flag bits in metadata comprising a private bit, a public bit, an assembly bit, a family bit and a virtual bit; and
   performing or refusing the override of the virtual method based on the at least one bit and the flag bits.

* * * * *